(12) United States Patent
Chin et al.

(10) Patent No.: US 9,008,662 B2
(45) Date of Patent: Apr. 14, 2015

(54) RFSP SELECTIVE CAMPING

(75) Inventors: Chen Ho Chin, Deerlijk (BE); Stefano M. Faccin, Hayward, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 291 days.

(21) Appl. No.: 13/577,575

(22) PCT Filed: Feb. 8, 2011

(86) PCT No.: PCT/US2011/024071
§ 371 (c)(1),
(2), (4) Date: Aug. 21, 2012

(87) PCT Pub. No.: WO2011/100252
PCT Pub. Date: Aug. 18, 2011

(65) Prior Publication Data
US 2012/0322448 A1    Dec. 20, 2012

Related U.S. Application Data

(60) Provisional application No. 61/302,921, filed on Feb. 9, 2010.

(51) Int. Cl.
*H04W 36/00*   (2009.01)
*H04W 48/18*   (2009.01)
*H04W 60/00*   (2009.01)

(52) U.S. Cl.
CPC .......... *H04W 36/0022* (2013.01); *H04W 48/18* (2013.01); *H04W 60/00* (2013.01)

(58) Field of Classification Search
CPC ..... H04W 16/08; H04W 36/00; H04W 36/06; H04W 36/16
USPC ........................... 455/463; 370/323, 332, 338
See application file for complete search history.

(56) References Cited

U.S. PATENT DOCUMENTS

| | | | |
|---|---|---|---|
| 8,594,074 B2 * | 11/2013 | Olsson et al. | 370/352 |
| 2004/0034710 A1 | 2/2004 | Rau | |
| 2006/0092924 A1 | 5/2006 | Jeong et al. | |
| 2008/0287148 A1 | 11/2008 | Silver et al. | |
| 2009/0238143 A1 | 9/2009 | Mukherjee et al. | |
| 2010/0159919 A1 | 6/2010 | Wu | |
| 2011/0149907 A1 | 6/2011 | Olsson et al. | |
| 2012/0106324 A1 * | 5/2012 | Keller et al. | 370/225 |

OTHER PUBLICATIONS

Chin, Chen Ho, et al.; U.S. Appl. No. 3/577,573, filed Aug. 31, 2012; Title: RFSP Selective Camping.
3GPP TS 23.038 V10.0.0; 3rd Generation Partnership Project; Technical Specification Group Core Network and Terminals; Alphabets and Language-Specific Information; Release 10; Mar. 2011; 56 pages.

(Continued)

*Primary Examiner* — Amancio Gonzalez
(74) *Attorney, Agent, or Firm* — Conley Rose, P.C.; J. Robert Brown, Jr.

(57) ABSTRACT

A user equipment (UE) is provided that includes one or more processors configured to perform one of an attach procedure, Routing Area Update (RAU), or Tracking Area Update (TAU), and then cause the UE to provide an indication to a network, wherein the indication indicates whether the UE has determined a voice solution in an Evolved Universal Mobile Telecommunications System Terrestrial Radio Access Network (E-UTRAN).

18 Claims, 2 Drawing Sheets

(56) References Cited

OTHER PUBLICATIONS

3GPP TS 23.060 V11.2.0 3rd Generation Partnership Project; Technical Specification Group Services and System Aspects; General Packet Radio Service (GPRS); Service Description; Stage 2; Release 11; Jun. 2012; 335 pages.
3GPP TS 23.221 V11.0.0; 3rd Generation Partnership Project; Technical Specification Group Services and System Aspects; Architectural Requirements; Release 11; Dec. 2011; 51 pages.
3GPP TS 23.271 V10.2.0; 3rd Generation Partnership Project; Technical Specification Group Services and System Aspects; Functional Stage 2 Description of Location Services (LCS); Release 10; Mar. 2011; 169 pages.
3GPP TS 24.080 V10.0.0; 3rd Generation Partnership Project; Technical Specification Group Core Network and Terminals; Mobile Radio Interface Layer 3 Supplementary Services Specification; Formats and Coding; Release 10; Mar. 2011; 44 pages.
3GPP TS 24.301 V11.3.0; 3rd Generation Partnership Project; Technical Specification Group Core Network and Terminals; Non-Access-Stratum (NAS) Protocol for Evolved Packet System (EPS); Stage 3; Release 11; Jun. 2012; 335 pages.
3GPP TS 23.009 V10.1.0; 3rd Generation Partnership Project; Technical Specification Group Core Network and Terminals; Handover Procedures; Release 10; Jun. 2012; 297 pages.
3GPP TSG-SA WG2 Meeting #76; "Provide an 'IMS Voice Over PS Supported' Indication to IMS"; S2-096841; San Jose Del Cabo, Mexico; Nov. 16-20, 2009; 1 page.
3GPP TSG SA WG2 Meeting #76; "UE Information for RFSP Facilitated Selective Camping to Enhance User CSFB Experience"; TD S2-097053; San Jose Del Cabo, Mexico; Nov. 16-20, 2009; 4 pages.
3GPP TSG-SA2 Meeting #75; "Delivery of UE Voice Capabilities/Settings in NAS Signalling"; S2-095993; Kyoto, Japan; Aug. 31-Sep. 4, 2009; 3 pages.
3GPP TSG-SA2 Meeting #75; "Enhanced Handling of RFSP Index at the SGSN"; S2-096005; Kyoto, Japan; Aug. 31-Sep. 4, 2009; 11 pages.
3GPP TSG-SA2 Meeting #75; "Delivery of UE Voice Capabilities/Settings in NAS Signalling"; S2-095994; Kyoto, Japan; Aug. 31-Sep. 4, 2009; 4 pages.
3GPP TSG-SA2 Meeting #75; "Enhanced Handling of RFSP Index at the MME"; S2-096004; Kyoto, Japan; Aug. 31-Sep. 4, 2009; 4 pages.
3GPP TSG CT WG1 Meeting #61; "UE Voice Capabilities/Settings in MS Network Capability"; C1-094042; Phoenix, USA; Oct. 12-16, 2009; 2 pages.
3GPP TSG-CT WG1 Meeting #62; "UE Voice Capabilities/Settings in MS Network Capability"; C1-095505; Beijing, P.R. China; Nov. 9-13, 2009; 6 pages.
PCT International Search Report; Application No. PCT/US2011/024070; May 17, 2011; 3 pages.
PCT Written Opinion of the International Searching Authority; Application No. PCT/US2011/024070; May 17, 2011; 5 pages.
3GPP TS 43.129 V9.1.0; 3rd Generation Partnership Project; Technical Specification Group GSM/EDGE Radio Access network; Packet-switched Handover for GERAN A/Gb Mode; Stage 2; Release 9; May 2010; 95 pages.
Taiwan Office Action; Application No. 100104332; Jul. 30, 2013; 10 pages.
Office Action dated Feb. 28, 2014; U.S. Appl. No. 13/577,573, filed Aug. 31, 2012; 26 pages.
Canadian Office Action; Application No. 2,788,531; Mar. 12, 2014; 3 pages.
PCT International Search Report; Application No. PCT/US2011/024071; May 24, 2011; 4 pages.
PCT Written Opinion of the International Searching Authority; Application No. PCT/US2011/024071; May 24, 2011; 8 pages.
3GPP TSG SA WG2 Meeting #75; "Selective Idle Mode Camping for Optimizing User Experience With CS Fallback"; S2-095445; Kyoto, Japan; Aug. 31-Sep. 4, 2009; 11 pages.
3GPP TSG-SA2 Meeting #75; "Delivery of UE Voice Capabilities/Settings in NAS Signaling"; S2-095448; Kyoto, Japan; Aug. 31-Sep. 4, 2009; 3 pages.
3GPP TS 23.401 v9.3.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 9; Dec. 2009; 254 pages.
3GPP TS 24.008 v9.1.0; 3rd Generation Partnership Project; Technical Specification Group Core Network and Terminals; Mobile Radio Interface Layer 3 Specification; Core Network Protocols; Stage 3; Release 9; Dec. 2009; 595 pages.
3GPP TSG CT WG1 Meeting #62; "UE Information for RFSP Facilitated Selective Camping to Enhance User CSFB Experience"; C1-094964; Beijing, China; Nov. 9-13, 2009; 4 pages.
Final Office Action dated Jun. 10, 2014; U.S. Appl. No. 13/577,573, filed Aug. 31, 2012; 10 pages.
Taiwan Office Action; Application No. 100104331; May 21, 2014; 8 pages.
Canadian Office Action; Application No. 2,788,524; Jul. 24, 2014; 3 pages.
Advisory Action dated Aug. 22, 2014; U.S. Appl. No. 13/577,573, filed Aug. 31, 2012; 3 pages.

* cited by examiner

RFSP SELECTIVE CAMPING

CROSS-REFERENCE TO RELATED APPLICATIONS

This application is a filing under 35 U.S.C. 371 of International Application No. PCT/US2011/024071 filed Feb. 8, 2011, entitled "RFSP Selective Camping" claiming priority to U.S. Provisional Application No. 61/302,921 filed on Feb. 9, 2010, entitled "RFSP Selective Camping", which these applications are incorporated by reference herein in their entirety.

BACKGROUND

As used herein, the terms "user equipment" ("UE"), "mobile station" ("MS"), and "user agent" ("UA") might in some cases refer to mobile devices such as mobile telephones, personal digital assistants, handheld or laptop computers, and similar devices that have telecommunications capabilities. The terms "MS," "UE," "UA," user device," and "user node" may be used synonymously herein. A UE might include components that allow the UE to communicate with other devices, and might also include one or more associated removable memory modules, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long-Term Evolution (LTE) and LTE-Advanced (LTE-A). For example, an LTE or LTE-A systems and devices might include an Evolved Universal Terrestrial Radio Access Network (E-UTRAN) which may include an E-UTRAN node B (or eNB), a Home E-UTRAN node B (HeNB), a relay node, or a similar component rather than a traditional base station. These components may be referred to as an access node. Other components, for example in UTRAN, WLAN or WiMAX, that may be referred to as an access node, may include a node B (NB), evolved node B (eNB), Home node B (HNB) or a wireless access point. The term "(e)NB" may contemplate NBs and eNBs.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
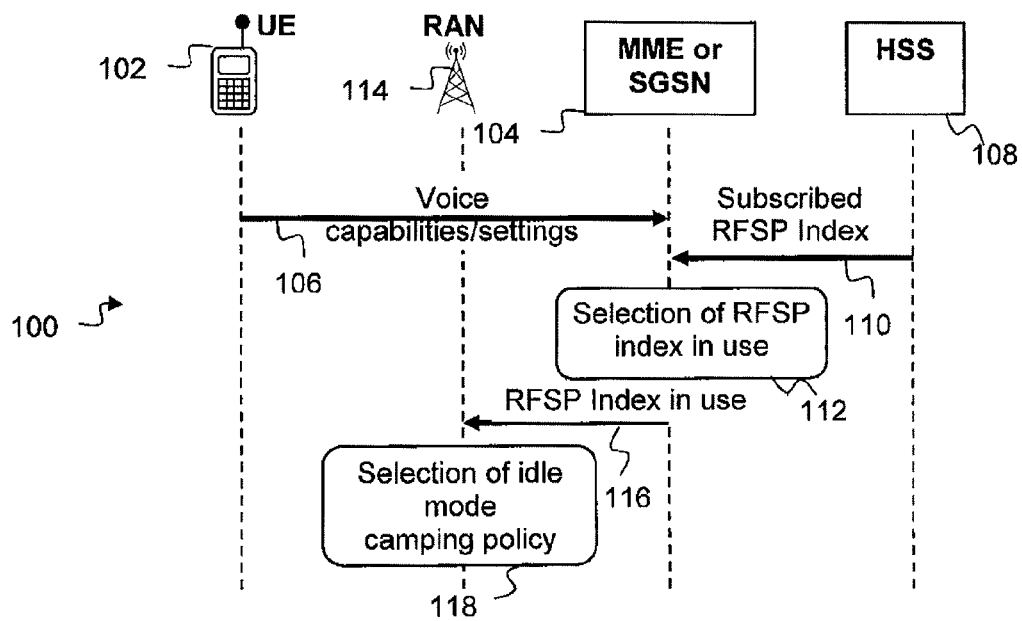
FIG. 1 is a block diagram showing an exchange of logical information during an attach, TAU, or RAU procedure, according to an embodiment of the present disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used throughout the specification, claims, and Figures, the following acronyms have the following definitions. Some of the terms identified below are defined by and follow the standards set forth by the Third Generation Partnership Program (3GPP) technical specifications. Where the 3GPP technical specifications use a term using the same acronym or words as those presented below, the 3GPP technical specifications describe the definition and functions of the corresponding term. However, the embodiments described herein use these components and/or functions according to inventive techniques described herein. Possibly, not all of the following terms are described in the 3GPP specifications.

"CS" is defined as "Circuit Switched."
"CSFB" is defined as "Circuit Switched Fallback."
"EDGE" is defined as "Enhanced Data rates for GSM Evolution."
"EPC" is defined as "Evolved Packet Core."
"E-UTRAN" is defined as "Evolved UTRAN."
"GERAN" is defined as "GSM EDGE Radio Access Network."
"GPRS" is defined as "General Packet Radio Subsystem."
"GSM" is defined as "Global System for Mobile Communications."
"GTP" is defined as "GPRS Tunneling Protocol."
"GUTI" is defined as "Globally Unique Temporary User Equipment Identity."
"HSS" is defined as "Home Subscriber Server/Subsystem."
"IMS" is defined as "Internet Protocol Media Subsystem."
"MM" is defined as "Mobility Management."
"MME" is defined as "MM Entity."
"NAS" is defined as "Non Access Stratum."
"PS" is defined as "Packet Switched."
"RA" is defined as "Routing Area."
"RAN" is defined as "Radio Access Network."

"RAT" is defined as "Radio Access Technology."
"RAU" is defined as "Routing Area Update."
"RFSP" is defined as "RAT Frequency Selection Policy."
"SAE" is defined as "System Architecture Evolution."
"SGSN" is defined as "Serving GPRS Support Node."
"S-TMSI" is defined as "SAE Temporary Mobile Subscriber Identity."
"TA" is defined as "Tracking Area."
"TAI" is defined as "Tracking Area Indicator."
"TAU" is defined as "TA Update."
"TS" is defined as "Technical Specification."
"UMTS" is defined as "Universal Mobile Telecommunications System."
"UTRAN" is defined as "UMTS Terrestrial RAN."
"VoPS" is defined as "Voice over Packet Switched."

As used herein, the following terms have the following definitions.

The term "may," in some embodiments, might refer to either a requirement or to a possibility depending on implementation. Thus, for example, the statement "the UE may place a call" could mean "the UE must place a call," "the UE shall place a call," or "the UE might possibly place a call," with possibly any one of these meanings being applicable depending on the implementation of a particular embodiment. Unless stated otherwise, the term "may," as used herein, could be interpreted as having any one of these meanings.

The embodiments described herein relate to resolving an ambiguity that may arise when a UE selects an idle mode selective camping policy. First, idle mode selective camping is described. Idle mode selective camping promotes UEs that are E-UTRAN capable to perform idle mode camping in a 2G/3G network. This procedure may allow the user to experience better CS voice services when the user places a voice call. If the UE is to be connected to a packet switched network for purposes of data transfer, then the UE can be handed over to the E-UTRAN in order to provide for better data services. Once connected and handed over to the E-UTRAN, the UE might use CSFB or IMS for voice services to perform a voice call.

The ambiguity that may arise when using idle mode selective camping is now described. The ambiguity is that the network may not differentiate between a UE that had first powered up in a 2G/3G network, and a UE which, in idle mode, reselected to the 2G/3G network from an E-UTRAN. If the UE had been in an E-UTRAN and then reselected to the 2G/3G, then the UE would know that the UE had a voice solution in the E-UTRAN. However, if the UE had powered up in the 2G/3G network, and then the UE were handed over to the E-UTRAN for packet switched services, the E-UTRAN would not know whether or not the UE had a voice solution in the E-UTRAN. As a result, in this latter case, the E-UTRAN may fail to provide the UE with voice services, and a voice call might undesirably fail. More technically, for a UE that powers up in 2G/3G, and which has not yet determined that it has voice service in an E-UTRAN, the RFSP index chosen for the UE should not incorrectly assume the UE has voice service in the E-UTRAN just because the UE has indicated its support of selective camping with a selective camping capability bit.

The embodiments described herein address this issue and resolve the ambiguity through four sets of embodiments. The first set of embodiments relates to conditional setting of a selective camping capability bit. The second set of embodiments relate to the network tracking the UE powering on. The third set of embodiments relate to explicit mode of operation NAS signaling. The fourth set of embodiments relate to UE taking an action if it knows the status of its own voice solution in E-UTRAN, with those actions generally relating to reporting or measuring E-UTRAN cells in the neighbor cell list of the UE. These and other embodiments are described further below.

FIG. 1 is a block diagram showing an exchange of logical information during an attach, TAU, or RAU procedure, according to an embodiment of the present disclosure. The various components shown in FIG. 1 may be implemented using a processor, such as that processor 610 shown in FIG. 6.

Information Exchange During an Attach, TAU, or RAU Procedure

In an embodiment, the UE may provide to the network the usage and voice settings of the UE. The network may use these UE usage and voice settings as an input in order for the network, for example the SGSN or the MME, to decide the RFSP index for individual UEs. The RFSP index may then be conveyed to the RAN, which in turn will provide to the UE a set of adjusted cell selection or reselection criteria when the UE goes from CONNECTED to IDLE mode. The UE may then use the received cell selection or reselection criteria for the purpose of IDLE mode camping. FIG. 1 illustrates this feature. This use of the UE provided information to select the RFSP Index may be referred to as "selection of an idle mode camping policy."

The selection of an idle mode camping policy may lead to the UE being provided a set of adjusted cell selection or reselection criteria. The adjusted cell selection or reselection criteria may reflect the operator's policy for the UE in IDLE mode. Thus, for example, the UE can use the adjusted criteria in order to favor camping in a 2G/3G network where the UE can use the CS domain for voice services.

In an embodiment, procedure 100 illustrates a logical exchange of information during an attach, combined attach, TAU, combined TAU, or RAU procedure. The UE 102 may transmit to the MME or SGSN 104 of the network the voice capabilities and/or settings of the UE 102, as shown at arrow 106. During the attach procedure, the HSS 108 of the network may transmit to the MME or SGSN 104 a subscribed RFSP index, as shown at arrow 110. The MME or SGSN 104 then may perform selection of the RFSP index in use using the subscribed RSFP index and the voice capabilities and/or settings, as shown at block 112.

Thereafter, the MME or SGSN 104 may transmit the RFSP index that is in use to the RAN 114, as shown at arrow 116. Finally, the RAN 114 may perform selection of the idle mode camping policy of the UE 102, as shown at block 118. The process terminates thereafter.

Differentiating Between a UE that Powered-Up and a UE that Reselected

Attention is now turned to the issue of differentiating between a UE that had first powered up in a 2G/3G network and a UE which, formerly in IDLE mode, reselected to a 2G/3G network from E-UTRAN. The feature of selective camping may promote UEs that are E-UTRAN capable to perform IDLE camping in 2G/3G so that the user may obtain better CS voice services. In particular, this feature may allow the network to hand the UE over to E-UTRAN when UE enters CONNECTED mode for PS sessions, because in E-UTRAN the PS services may be better. When UE is handed back to E-UTRAN, the UE might use CSFB or IMS for voice services. Thus, a purpose of selective camping may be to allow the UE to be handed over to E-UTRAN for better PS services, but to allow a UE in E-UTRAN to receive voice services either by CSFB or by IMS Voice over PS (IMS-VoPS), and for an IDLE UE to camp in 2G/3G to optimize CS call setup time.

However, the UE's behavior may be unclear in the case where an E-UTRAN capable UE powers on in 2G/3G, and then performs IDLE mode camping in 2G/3G. For example, a question arises whether the UE in this case should be considered as utilizing selective IDLE camping, and therefore should be handed to E-UTRAN when in CONNECTED mode for PS service. If so, and the 2G/3G core network were to hand over this UE to E-UTRAN when the UE enters connected mode for a PS session, then the network may not be sure the UE will receive voice services in E-UTRAN, because the UE powered up in 2G/3G and had not yet performed the voice domain selection steps in E-UTRAN to select a voice solution and verify if a voice solution is available.

In other words, an issue that may rise with respect to RFSP selective camping may be that the network cannot differentiate between a UE that had first powered up in 2G/3G and a UE which, in IDLE mode reselected, to 2G/3G from E-UTRAN. If a UE in IDLE had reselected to 2G/3G from E-UTRAN and if that UE's E-UTRAN capabilities were ON, then when the UE enters CONNECTED mode in 2G/3G the network knows that the UE has a voice solution in E-UTRAN. The network may also know that the UE had reselected to 2G/3G to apply selective IDLE mode camping, and therefore the network may know that the UE has a voice solution in E-UTRAN. In this case, the UE previously connected to E-UTRAN, performed the voice domain selection process, and obtained voice service over E-UTRAN.

One Bit Indication

In an embodiment, a one bit indication termed "selective camping capability" may be provided in a "MS network capabilities information element" to indicate, from the UE to the network, if the MS supports the selective camping capability which allows the MS to send to the network the UE's usage setting and the voice domain preference. When this selective camping capability bit is set 'true,' for example having a value of "1," the provided UE usage and voice settings may be valid and may be used by the network. However, if this selective camping capability bit is not set or is set to 'false,' for example having a value of "0," then the provided UE usage and voice settings are not valid, or the UE may not provide UE usage and voice settings. One of the reasons for having this bit may be for backward compatibility where a network might not know if a UE had set 'zeros' or if UE had not implemented selective IDLE mode camping through RFSP. This reason may apply if only the UE usage and voice settings are provided in the exact representation provided in the IMS connectivity management object.

Having a bit that indicates whether the UE supports selective camping, and also indicates that the provided UE usage and voice settings are valid, tells the network that information provided can be used. However, rules and behavior governing when the UE should manipulate the selective camping capability bit have not been defined. In an embodiment, Release 9 UEs may automatically set the selective camping capability bit to 'true' and provide UE usage and voice settings; however, automatic setting of the selective camping capability bit may not always be provided in a UE. Furthermore, it remains ambiguous what happens when a UE powers up in a 2G/3G network and the network has not determined if the UE has an E-UTRAN voice solution.

Overview of Some of the Embodiments

The UE may be in a better position to decide whether the UE should be handed over to E-UTRAN. The UE may be in a better position to make this decision because the UE may know if there is a possibility that the UE has no voice solution in E-UTRAN when the UE becomes PS connected in UTRAN/GERAN, whereas the network does not have such knowledge. If the UE has no voice solution in E-UTRAN or the UE does not know whether it has a voice solution available in E-UTRAN, for example when the UE first powers up in 2G/3G, then the UE should not be handed over to E-UTRAN when it becomes PS connected. Thus, a possible resolution to the ambiguity described above is for the UE to make a determination regarding UE behavior during RFSP selective camping.

Conditional Setting of the "Selective Camping Capability" Bit

In an embodiment, the UE may not set the selective camping capability bit if the UE powers up in GERAN/UTRAN. Nevertheless, possibly only when UE has determined that the UE has an E-UTRAN-usable voice service solution, the UE may set the selective camping capability bit. The UE may then inform the network of a change of the selective camping capability. The UE may inform the network using any suitable technique, such as for example with appropriate NAS signaling.

In this embodiment, unless and until the UE has moved to E-UTRAN after it has powered on in GERAN/UTRAN, and has determined that a voice solution is available over E-UTRAN, the selective camping capability bit is not set. When UE moves to E-UTRAN after powering up in GERAN/UTRAN, and in E-UTRAN the UE performs a voice domain selection process and the UE determines that it does have a voice solution in E-UTRAN, then UE may set the selective camping capability bit to true. This embodiment may be utilized in the NAS attach and combined attach procedures, and also in the RAU procedures and TAU procedures and combined TAU procedures.

Thus, UEs that support the selective camping capability may only set the selective camping capability bit to indicate support if the UE has determined that it has voice service in E-UTRAN. In an embodiment, If the UE is attaching for GPRS services for the first time after a power on or when UE has not yet determined that it has voice service in E-UTRAN S1 mode of operation, for example as specified in 3GPP TS 23.221, then the UE may not indicate support of selective camping capability in the selective camping capability bit. In another embodiment, if the UE is attaching for non-GPRS services and GPRS services for the first time after a power on, or when UE has not yet determined that it has voice service in E-UTRAN S1 mode of operation as above, the UE may not indicate support of selective camping capability in the selective camping capability bit.

If the routing area updating procedure is initiated by the UE and the UE has determined that it has voice service in E-UTRAN S1 mode of operation, and the UE supports the selective camping capability feature, then the UE may indicate support of selective camping capability in the selective camping capability bit. Otherwise, the UE may not indicate support of selective camping capability in the selective camping capability bit. The RAU procedure may be initiated by the UE due to one of the following reasons. One reason for initiating the RAU procedure may be a change from S1 mode to Iu mode or from S1 mode to A/Gb mode inter-system change in connected mode or in idle mode. Another reason may be a normal routing area updating. Another reason may be periodic routing area updating.

In an embodiment, if the combined routing area updating procedure is to be initiated and the UE has determined that it has voice service in E-UTRAN S1 mode of operation, such as specified in 3GPP TS 23.221, and the UE supports the selective camping capability feature, the UE may indicate support of selective camping capability in the selective camping capability bit. Else, the UE may not indicate support of selective camping capability in the selective camping capability bit.

In yet another embodiment, upon determining the access domain for voice sessions or calls, such as specified in 3GPP TS 23.221, sub clause 7.2a, if the UE determines that it has voice service in E-UTRAN S1 mode and the UE supports the selective camping capability feature, the UE may indicate support of selective camping capability in the selective camping capability bit in the next provision of UE network capability information to the network. Otherwise, the UE may not indicate support of selective camping capability in the selective camping capability bit.

In still another embodiment, The UE may determine the access domain for voice sessions or calls, such as specified in 3GPP TS 23.221, sub clause 7.2a, as part of the handling of TRACKING AREA UPDATE ACCEPT message from the network. If the UE determines that it has voice service in E-UTRAN S1 mode and the UE supports the selective camping capability feature, the UE may indicate support of selective camping capability in the selective camping capability bit in the next provision of MS network capability information to the network. Otherwise, the UE may not indicate support of selective camping capability in the selective camping capability bit.

Network Tracking of the UE Powering ON

The embodiments described above related to conditional setting of the selective camping capability bit. Another set of embodiments may be available for addressing the ambiguity above. In particular, the network may be used to track whether the UE powers up in GERAN/UTRAN.

For example, the network may keep track of the fact that the UE powers up in GERAN/UTRAN before the UE reselects or is handed-over to E-UTRAN. The GERAN/UTRAN network may perform this tracking by associating a flag or an indication or a piece of information in the SGSN when the network receives an attach request from the UE (at power on) indicating that the UE is E-UTRAN capable. This flag or indication or piece of information may let the network (e.g. the SGSN) know that the UE has yet to determine if the UE has a voice solution in E-UTRAN. Therefore, if the UE usage setting indicates that the UE is Voice Centric, then the UE's usage and voice settings may not yet be used to select camping policies through selection. Likewise, the UE's usage and voice settings may not be used to provision an RFSP index to the RAN that will trigger a handover to E-UTRAN when the UE becomes PS connected over GERAN/UTRAN. In this way, the GERAN/UTRAN network need not handover a voice centric UE to E-UTRAN on establishment of a PS data session, because the SGSN may not provide to the RAN an RFSP that triggers the handover to E-UTRAN when the UE becomes PS connected.

If the UE physically moves to another location in the GERAN/UTRAN, this piece of information may be passed to the new SGSN, if there is a change of SGSN. In this manner, the GERAN/UTRAN may keep the knowledge of whether the UE has a voice solution in E-UTRAN.

When the UE autonomously reselects to E-UTRAN, or by handover moves to E-UTRAN such as for the case of a data centric UE, and due to mobility moves to a tracking area outside the current TAI List, the UE may then in its normal course of operation also run the voice domain selection process. This process may be defined in 3GPP TS 23.221. The UE may also run the voice domain selection process when UE powers on in E-UTRAN.

When such a voice domain selection process is run in the UE, the outcome of this process may not be known to the network. In other words, if a UE running a voice domain selection process concludes that the UE has a voice solution in E-UTRAN, then this fact may be known only to the UE. The UE need not report this conclusion to the network. However, the network, knowing the UE is voice centric and has completed the registration update in E-UTRAN, may conclude that the UE has a voice solution in E-UTRAN. Thus, upon completion of the registration update in E-UTRAN, the network may update its flag, indication, or piece of information that allows the network to know that the UE's usage and voice setting can be used to select camping policies through selection and provision of RFSP index to RAN. The MME may provides such information to the SGSN so that if the UE autonomously reselects in idle mode to GERAN/UTRAN and the UE becomes PS connected, then the GERAN/UTRAN has the correct RFSP to decide when to push the UE to E-UTRAN.

In one embodiment for solving the ambiguity described above, the SGSN may store the information that the UE first connects to GERAN/UTRAN, such as when the UE has previously successfully registered to E-UTRAN, the UE may have an S-TMSI or GUTI or other identification to the last MME. Based on such information, if the UE usage setting is voice centric, the SGSN may not provide an RFSP index to the RAN that will trigger the handover of the UE to E-UTRAN when the UE becomes PS connected over GERAN/UTRAN. The SGSN need not provide the RFSP index because the UE provided the voice centric usage setting to the SGSN during the attach or RAU procedure.

Explicit Mode of Operation NAS Signaling

Two sets of embodiments have been described above, conditional setting of the selective camping capability bit, and network tracking of the UE powering on. Attention is now turned to a third set of embodiments with respect to telling the difference between a UE powering on in 2G/3G and a UE which, in IDLE mode, reselected to 2G/3G from an E-UTRAN, explicit mode of operation NAS signaling.

Explicit mode of operation NAS signaling may apply to a UE that is combined attached over E-UTRAN, has provided voice and usage settings to the network, is idle camping in GERAN/UTRAN, and becomes PS connected over GERAN/UTRAN. This embodiment also may apply to a UE knowing it has yet to determine if it has a voice solution in E-UTRAN, such as in the case of a UE that powers up in GERAN/UTRAN and has yet to get onto E_UTRAN. This embodiment also may apply to a UE that has determined it has no voice solution available over E-UTRAN.

In this embodiment, when the UE performs attach, combined attach, RAU, TAU or combined TAU NAS signaling, the UE may provide an indication to the network, for example the SGSN or the MME, of whether the UE has determined a voice solution in E-UTRAN. The indication, when received by the network, may allow the network to know whether the UE has determined a voice solution. The indication may also allow the network to know whether the UE has a voice solution. If the UE has a voice solution, the UE may be handed over to an E-UTRAN, though in other embodiments the network may decide that the UE should not be handed over to an E-UTRAN.

The indication described above may be implemented by reusing the voice centric or data centric setting information elements and inserting a new value into these information elements. Alternatively, the indication may be implemented by defining a new information element in GPRS and EPC attach, combined attach, RAU, combined TAU and TAU signaling, with the new information element being specific to the proposed meaning or meanings.

In an embodiment, if the UE is attaching for GPRS services for the first time after a power on, or when the UE has not yet determined that it has voice service in E-UTRAN S1 mode of operation as specified in 3GPP TS 23.221, the UE may indicate that it has no voice service in E-UTRAN S1 mode of operation in the voice service in an E-UTRAN S1-mode available bit. In another embodiment, if the UE is attaching for non-GPRS services and GPRS services for the first time after a power on, or when the UE has not yet determined that it has voice services in E-UTRAN S1 mode of operation as specified in 3GPP TS 23.221, the UE may indicate that it has no voice service in E-UTRAN S1 mode of operation in the voice service in the E-UTRAN S1-mode available bit.

In yet another embodiment, if the routing area updating procedure is initiated by the MS due to the S1 mode to Iu mode or S1 mode to A/Gb mode inter-system change in connected mode or in idle mode and MS has determined that it has voice service in E-UTRAN S1 mode of operation as specified in 3GPP TS 23.221, and the UE supports the selective camping capability feature, the UE may indicate that it has voice service in E-UTRAN S1 mode of operation in the voice service in E-UTRAN S1-mode available bit. In still another embodiment, if the combined routing area updating procedure is to be initiated, and the UE has determined that it has voice service in E-UTRAN S1 mode of operation as specified in 3GPP TS 23.221, and the UE supports the selective camping capability feature, the UE may indicate that it has voice service in E-UTRAN S1 mode of operation in the voice service in E-UTRAN S1-mode available bit.

The following is a non-limiting example of a "UE network capability" information element.

```
<MS network capability value part> ::=
    <GEA1 bits>
    <SM capabilities via dedicated channels: bit>
    <SM capabilities via GPRS channels: bit>
        <UCS2 support: bit>
    <SS Screening Indicator: bit string(2)>
    <SoLSA Capability : bit>
    <Revision level indicator: bit>
    <PFC feature mode: bit>
    <Extended GEA bits>
    <LCS VA capability: bit>
    <PS inter-RAT HO to UTRAN Iu mode capability: bit>
    <PS inter-RAT HO to E-UTRAN S1 mode capability: bit>
    <CSFB Capability: bit>
    <ISR support: bit>
    <SRVCC to GERAN/UTRAN capability: bit>
    <EPC capability: bit>
    <Selective camping capability: bit>
    <Voice service in E-UTRAN S1 mode available: bit>
    <NF capability: bit>
    <Spare bits>;
<GEA1 bits> ::= < GEA/1 :bit>;
<Extended GEA bits> ::= <GEA/2:bit><GEA/3:bit>< GEA/4:bit >< GEA/5:bit ><
GEA/6:bit ><GEA/7:bit>;
<Spare bits> ::= null | {<spare bit> < Spare bits >};
SS Screening Indicator
    0 0    defined in 3GPP TS 24.080 [24]
    0 1    defined in 3GPP TS 24.080 [24]
    1 0    defined in 3GPP TS 24.080 [24]
    1 1    defined in 3GPP TS 24.080 [24]
```

SM Capabilities Via Dedicated Channels

0 Mobile station does not support mobile terminated point to point SMS via CS domain 1 Mobile station supports mobile terminated point to point SMS via CS domain SM Capabilities Via GPRS Channels 0 Mobile station does not support mobile terminated point to point SMS via PS domain 1 Mobile station supports mobile terminated point to point SMS via PS domain UCS2 Support This information field indicates the likely treatment by the mobile station of UCS2 encoded character strings.

0 the ME has a preference for the default alphabet (defined in 3GPP 23.038 [8b]) over UCS2.

1 the ME has no preference between the use of the default alphabet and the use of UCS2.

GPRS Encryption Algorithm GEA/1

0 encryption algorithm GEA/1 not available 1 encryption algorithm GEA/1 available SoLSA Capability 0 The ME does not support SoLSA.

1 The ME supports SoLSA.

Revision Level Indicator 0 used by a mobile station not supporting R99 or later versions of the protocol 1 used by a mobile station supporting R99 or later versions of the protocol PFC Feature Mode 0 Mobile station does not support BSS packet flow procedures 1 Mobile station does support BSS packet flow procedures

GEA/2

0 encryption algorithm GEA/2 not available 1 encryption algorithm GEA/2 available

GEA/3

0 encryption algorithm GEA/3 not available 1 encryption algorithm GEA/3 available

GEA/4

0 encryption algorithm GEA/4 not available 1 encryption algorithm GEA/4 available

GEA/5

0 encryption algorithm GEA/5 not available 1 encryption algorithm GEA/5 available

GEA/6

0 encryption algorithm GEA/6 not available 1 encryption algorithm GEA/6 available

GEA/7

0 encryption algorithm GEA/7 not available 1 encryption algorithm GEA/7 available LCS VA Capability (LCS Value Added Location Request Notification Capability)

This information field indicates the support of the LCS value added location request notification via PS domain as defined in 3GPP TS 23.271[105].

0 location request notification via PS domain not supported 1 location request notification via PS domain supported PS inter-RAT HO to UTRAN Iu Mode Capability This information field indicates the support of the PS inter-RAT HO to UTRAN Iu mode.

0 PS inter-RAT HO to UTRAN Iu mode not supported

1 PS inter-RAT HO to UTRAN Iu mode supported

PS inter-RAT HO to E-UTRAN S1 Mode Capability

This information field indicates the support of the PS inter-RAT HO to E-UTRAN S1 mode.

0 PS inter-RAT HO to E-UTRAN S1 mode not supported
1 PS inter-RAT HO to E-UTRAN S1 mode supported
CSFB Capability
This information field indicates the support of the CS fallback.
  0 Mobile station does not support CS fallback
  1 Mobile station supports CS fallback
  ISR support
  0 The mobile station does not support ISR.
  1 The mobile station supports ISR.
  SRVCC to GERAN/UTRAN Capability
  0 SRVCC from UTRAN HSPA or E-UTRAN to GERAN/UTRAN not supported
  1 SRVCC from UTRAN HSPA or E-UTRAN to GERAN/UTRAN supported
  EPC Capability
This information field indicates if the MS supports access to the EPC via access networks other than GERAN or UTRAN. The network can use this information to decide whether to select a PDN Gateway or a GGSN. The MS shall set the indication to "0" if a SIM is inserted in the MS.
  0 EPC not supported
  1 EPC supported
  NF Capability
This information field indicates if the MS supports the notification procedure.
  0 Mobile station does not support the notification procedure.
  1 Mobile station supports the notification procedure.
  Selective Camping Capability
This information field indicates whether the MS supports the Selective camping capability which allows the MS to send to the network the UE's usage setting and the Voice domain preference. The use of this information is only for input to selection of camping strategies for the MS. Based on operator policy the network can ignore the Selective camping capability when the UE is registered in a VPLMN.
  0 Selective camping capability not supported
  1 Selective camping capability supported
  Voice Service in E-Utran S1 Mode Available
This information field indicates whether the MS has determined that it has voice service in E-UTRAN S1 mode of operation as specified in 3GPP TS 23.221[131].
  0 MS does not have voice service in E-UTRAN S1 mode or MS has not yet determined it has voice service in E-UTRAN S1 mode.
  1 MS has determined that it has voice service in E-UTRAN S1 mode.

In the above information element, the UE's usage setting and the voice domain preference may be sent to the network in order to select the camping strategy for the UE. In an embodiment, these setting and preference might be provided in the UE network capability information element or in a dedicated information element. In another embodiment, the UE might provide information to the network to optimize the selection of RFSP index.

In another embodiment, upon determining the access domain for voice sessions or calls as specified in 3GPP TS 23.221, sub clause 7.2a, if the UE determines that it has voice service in E-UTRAN S1 mode and the UE supports the selective camping capability feature, the UE may indicate that it has voice service in E-UTRAN S1 mode of operation. The UE may perform this indication by setting the voice service in an E-UTRAN S1-mode available bit in the next occasion the UE has to provide "UE network capability information" to the network.

In still another embodiment, the UE may determine the access domain for voice sessions or calls as specified in 3GPP TS 23.221, sub clause 7.2a as part of the handling of TRACKING AREA UPDATE ACCEPT message from the network. If the UE determines that it has voice service in E-UTRAN S1 mode, and the UE supports the selective camping capability feature, the UE may indicate that it has voice service in E-UTRAN S1 mode of operation. The UE may perform this indication by setting the voice service in an E-UTRAN S1-mode available bit in the next occasion the UE has to provide MS network capability information to the network.

Implicit UE-Controlled Handover Triggering

Thus far, three sets of embodiments have been described for resolving the ambiguity described above with respect to telling the difference between a UE powering on in 2G/3G and a UE which, in IDLE mode, reselected to 2G/3G from an E-UTRAN. The first set of embodiments related to conditional setting of a selective camping capability bit. The second set of embodiments related to the network tracking the UE powering on. The third set of embodiments related to explicit mode of operation NAS signaling.

Attention is now turned to a fourth set of embodiments for resolving the ambiguity described above, implicit UE control of handover triggering. This set of embodiments may apply to a UE that is combined attached over E-UTRAN, wherein the UE knows it has provided voice and usage settings to the network, wherein the UE is idle camping in GERAN/UTRAN, and wherein the UE becomes PS connected over GERAN/UTRAN. This set of embodiments may also apply to a UE knowing it has yet to determine if it has a voice solution in E-UTRAN. For example, a UE may know it has yet to determine if it has a voice solution in E-UTRAN if the UE powers up in GERAN/UTRAN but has yet to get onto E-UTRAN.

In this set of embodiments, if UE knows the status of its voice solution in E-UTRAN, the UE may take one of several actions. The UE may choose not to report measurement of the E-UTRAN cells in its neighbor cell list. The UE may not perform measurement of the E-UTRAN cells in its neighbor cell list. Additionally, the UE may bias against the measurement performed for the E-UTRAN cells in its neighbor cell list. Any of these procedures may be performed according to whether UE has a voice solution in E-UTRAN.

Figure 2:
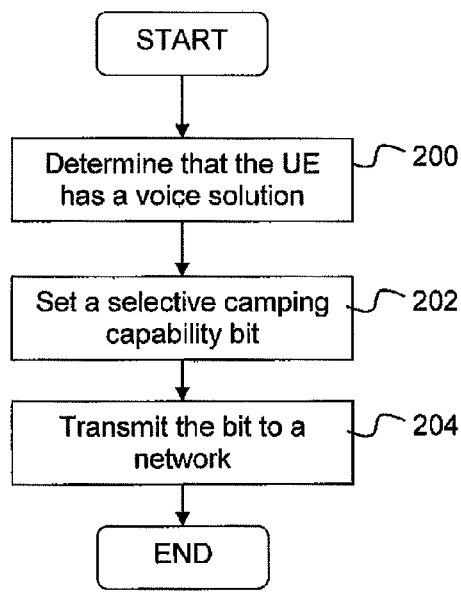
FIG. 2 is a flowchart of a process for setting a selective camping bit, according to an embodiment of the present disclosure.

FIG. 2 is a flowchart of a process for setting a selective camping bit, according to an embodiment of the present disclosure. The process shown in FIG. 2 may be implemented in a UE, such as UE 102 of FIG. 1 or system 600 of FIG. 6. The process shown in FIG. 2 is a non-limiting embodiment of the techniques described above with respect to FIG. 1 for resolving the ambiguity described above.

The process begins as the UE determines that the UE has a voice solution (block 200). The UE then sets a selective camping capability bit (block 202). Finally, the UE transmits the bit to a network (block 204). The process terminates thereafter.

Figure 3:
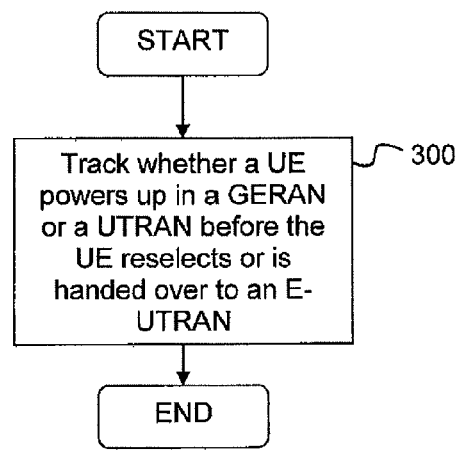
FIG. 3 is a flowchart of a process for tracking whether a UE powers up in a GERAN or a UTRAN before the UE reselects or is handed over to an E-UTRAN, according to an embodiment of the present disclosure.

FIG. 3 is a flowchart of a process for tracking whether a UE powers up in a GERAN or a UTRAN before the UE reselects or is handed over to an E-UTRAN, according to an embodiment of the present disclosure. The process shown in FIG. 3 may be implemented in a network component, such as RAN 114, MME or SGSN 104, HSS 108 of FIG. 1, or a processor, such as processor 610 in FIG. 6. The process shown in FIG. 2 is a non-limiting embodiment of the techniques described above with respect to FIG. 1 for resolving the ambiguity described above.

The process comprises tracking whether a UE powers up in a GERAN or a UTRAN before the UE reselects or is handed over to an E-UTRAN (block 300). The process terminates thereafter.

Figure 4:
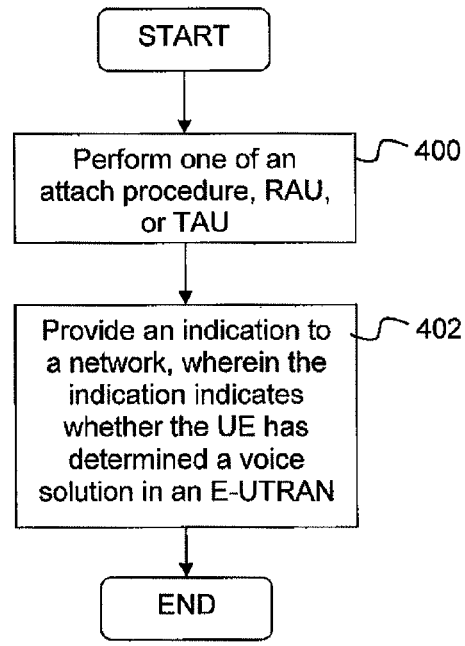
FIG. 4 is a flowchart of a process for providing an indication to a network of whether the UE has determined a voice solution in an E-UTRAN, according to an embodiment of the present disclosure.

FIG. 4 is a flowchart of a process for providing an indication to a network of whether the UE has determined a voice solution in an E-UTRAN, according to an embodiment of the present disclosure. The process shown in FIG. 4 may be implemented in a UE, such as UE 102 of FIG. 1 or system 600 of FIG. 6. The process shown in FIG. 4 is a non-limiting embodiment of the techniques described above with respect to FIG. 1 for resolving the ambiguity described above.

The process begins as the UE performs one of an attach procedure, RAU, or TAU (block 400). The UE then provides an indication to a network, wherein the indication indicates whether the UE has determined a voice solution in an E-UTRAN (block 402). The process terminates thereafter.

Figure 5:
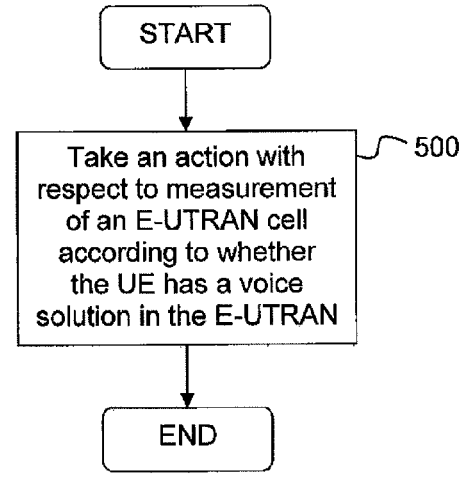
FIG. 5 is a flowchart of a process for taking an action with respect to measurement of an E-UTRAN cell according to whether the UE has a voice solution in the E-UTRAN, according to an embodiment of the present disclosure.

FIG. 5 is a flowchart of a process for taking an action with respect to measurement of an E-UTRAN cell according to whether the UE has a voice solution in the E-UTRAN, according to an embodiment of the present disclosure. The process shown in FIG. 5 may be implemented in a UE, such as UE 102 of FIG. 1 or system 600 of FIG. 6. The process shown in FIG. 5 is a non-limiting embodiment of the techniques described above with respect to FIG. 1 for resolving the ambiguity described above.

The process comprises taking an action with respect to measurement of an E-UTRAN cell according to whether the UE has a voice solution in the E-UTRAN (block 500). The process terminates thereafter.

Figure 6:
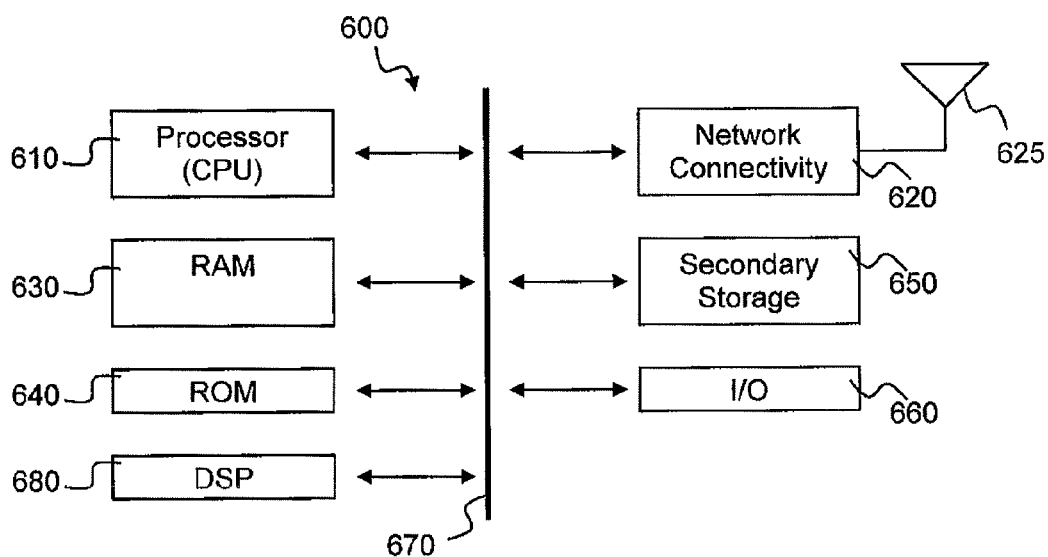
FIG. 6 illustrates a processor and related components suitable for implementing the several embodiments of the present disclosure.

The UE and other components described above might include processing and other components that alone or in combination are capable of executing instructions or otherwise able to promote the occurrence of the actions described above. FIG. 6 illustrates an example of a system 600 that includes a processing component, such as processor 610, suitable for implementing one or more embodiments disclosed herein. In addition to the processor 610 (which may be referred to as a central processor unit or CPU), the system 600 might include network connectivity devices 620, random access memory (RAM) 630, read only memory (ROM) 640, secondary storage 650, and input/output (I/O) devices 660. These components might communicate with one another via a bus 600. In some cases, some of these components may not be present or may be combined in various combinations with one another or with other components not shown. These components might be located in a single physical entity or in more than one physical entity. Any actions described herein as being taken by the processor 610 might be taken by the processor 610 alone or by the processor 610 in conjunction with one or more components shown or not shown in the drawing, such as a digital signal processor (DSP) 680. Although the DSP 680 is shown as a separate component, the DSP 680 might be incorporated into the processor 610.

The processor 610 executes instructions, codes, computer programs, or scripts that it might access from the network connectivity devices 620, RAM 630, ROM 640, or secondary storage 650 (which might include various disk-based systems such as hard disk, floppy disk, or optical disk). While only one CPU 610 is shown, multiple processors may be present. Thus, while instructions may be discussed as being executed by a processor, the instructions may be executed simultaneously, serially, or otherwise by one or multiple processors. The processor 610 may be implemented as one or more CPU chips.

The network connectivity devices 620 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 620 may enable the processor 610 to communicate with the Internet or one or more telecommunications networks or other networks from which the processor 610 might receive information or to which the processor 610 might output information. The network connectivity devices 620 might also include one or more transceiver components 625 capable of transmitting and/or receiving data wirelessly.

The RAM 630 might be used to store volatile data and perhaps to store instructions that are executed by the processor 610. The ROM 640 is a non-volatile memory device that typically has a smaller memory capacity than the memory capacity of the secondary storage 650. ROM 640 might be used to store instructions and perhaps data that are read during execution of the instructions. Access to both RAM 630 and ROM 640 is typically faster than to secondary storage 650. The secondary storage 650 is typically comprised of one or more disk drives or tape drives and might be used for non-volatile storage of data or as an over-flow data storage device if RAM 630 is not large enough to hold all working data. Secondary storage 650 may be used to store programs that are loaded into RAM 630 when such programs are selected for execution.

The I/O devices 660 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 625 might be considered to be a component of the I/O devices 660 instead of or in addition to being a component of the network connectivity devices 620.

Thus, the embodiments provide for a UE. The UE includes one or more processors configured to, responsive to determining that the UE has a voice service solution, set a "selective camping capability bit" and transmit the bit to a network.

The embodiments also provide for a network. The network includes one or more processors configured to track whether a user equipment (UE) powers up in a Global System for Mobile Communications (GSM) Enhanced Data Rates for GSM Evolution Radio Access Network (GERAN) or a Universal Mobile Telecommunications System Terrestrial Radio Access Network (UTRAN) before the UE reselects or is handed over to an Evolved UTRAN (E-UTRAN).

The embodiments further provide for another UE. The UE includes one or more processors configured to perform one of an attach procedure, Routing Area Update (RAU), or Tracking Area Update (TAU), and then cause the UE to provide an indication to a network, wherein the indication indicates whether the UE has determined a voice solution in an Evolved Universal Mobile Telecommunications System Terrestrial Radio Access Network (E-UTRAN).

The embodiments yet further provide for still another UE. The UE includes one or more processors configured to cause the UE to take an action with respect to measurement of an Evolved Universal Mobile Telecommunications System Terrestrial Radio Access Network (E-UTRAN) cell according to whether the UE has a voice solution in the E-UTRAN.

In another embodiment, a network component is provided that includes one or more processors configured to track whether a user equipment (UE) powers up in a Global System for Mobile Communications (GSM) Enhanced Data Rates for GSM Evolution Radio Access Network (GERAN) or a Universal Mobile Telecommunications System Terrestrial Radio Access Network (UTRAN) before the UE reselects or is handed over to an Evolved UTRAN (E-UTRAN). In some embodiments, the network is part of a GERAN or UTRAN and wherein, when the network receives an attach request from the UE, the processor is configured to cause a flag in an SGSN to be used to indicate that the UE is E-UTRAN capable.

The flag may indicate that the UE has yet to determine if the UE has a voice solution in E-UTRAN and wherein the processor is further configured to provision an RFSP index to a radio access network such that the RFSP index will trigger a handover of the UE to the E-UTRAN when the UE becomes packet switched connected over the GERAN or UTRAN. In still other cases, the processor may be further configured to avoid handing over the UE to the E-UTRAN if the SGSN does not provide the RFSP index. Also, the processor may be configured, responsive to a change in SGSNs relative to the UE, to pass the flag to a new SGSN. Still further, the processor may be configured to receive a registration update from the UE, determine that the UE has a voice solution in an E-UTRAN, and update the flag to indicate that the network should provision a RFSP index to a radio access network associated with the UE.

In other embodiments, a method implemented in a network component is provided that includes tracking, using a processor, whether a user equipment (UE) powers up in a Global System for Mobile Communications (GSM) Enhanced Data Rates for GSM Evolution Radio Access Network (GERAN) or a Universal Mobile Telecommunications System Terrestrial Radio Access Network (UTRAN) before the UE reselects or is handed over to an Evolved UTRAN (E-UTRAN).

A computer readable medium storing a program is also disclosed in which, when executed, performs the processor-implemented steps of tracking, by a network, whether a user equipment (UE) powers up in a Global System for Mobile Communications (GSM) Enhanced Data Rates for GSM Evolution Radio Access Network (GERAN) or a Universal Mobile Telecommunications System Terrestrial Radio Access Network (UTRAN) before the UE reselects or is handed over to an Evolved UTRAN (E-UTRAN).

In another embodiment, a user equipment (UE) is provided that includes one or more processors configured to cause the UE to take an action with respect to measurement of an Evolved Universal Mobile Telecommunications System Terrestrial Radio Access Network (E-UTRAN) cell according to whether the UE has a voice solution in the E-UTRAN. In some cases, the action comprises avoiding reporting measurement of the E-UTRAN cell in a neighbor cell list of the UE, while in other cases the action comprises avoiding measurement of the E-UTRAN cell in a neighbor cell list of the UE. In still other cases, the action comprises biasing against the measurement performed for the E-UTRAN cell in a neighbor cell list of the UE. In some embodiments, the processor may be configured to provide the indication responsive to all of 1) the UE being combined attached over an E-UTRAN, 2) the UE has provided voice and usage settings to a network, 3) the UE is IDLE camping in a GERAN or UTRAN, and 4) the UE becomes packet switched connected over the GERAN or UTRAN. In other embodiments, the processor may be configured to provide the indication responsive to the UE having not determined if the UE has a voice solution in the E-UTRAN.

In another embodiment, a method implemented in a user equipment (UE) is provided that includes taking an action, by a processor, with respect to measurement of an Evolved Universal Mobile Telecommunications System Terrestrial Radio Access Network (E-UTRAN) cell according to whether the UE has a voice solution in the E-UTRAN. In other embodiments, a computer readable medium storing a program is provided which, when executed, performs the processor-implemented steps of a user equipment (UE) taking an action with respect to measurement of an Evolved Universal Mobile Telecommunications System Terrestrial Radio Access Network (E-UTRAN) cell according to whether the UE has a voice solution in the E-UTRAN.

The following 3GPP technical specifications are hereby incorporated by reference in their entireties: 23.038, 23.060, 23.221, 23.271, 23.401, 24.008, 24.080, and 24.301.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
   one or more processors configured to perform one of an attach procedure, Routing Area Update (RAU), or Tracking Area Update (TAU), and then cause the UE to provide an indication to a network, wherein the indication indicates whether the UE has determined a voice solution in an Evolved Universal Mobile Telecommunications System Terrestrial Radio Access Network (E-UTRAN).

2. The UE of claim 1 wherein the indication is further configured to allow a SGSN to know whether the UE can be handed over to the E-UTRAN.

3. The UE of claim 1 wherein the indication is implemented by inserting a value into a voice centric or data centric setting information element.

4. The UE of claim 1 wherein the indication is implemented using a specific information element that indicates whether the UE can be handed over the E-UTRAN, and wherein the information element is used in at least one of GPRS signaling, EPC attach signaling, RAU signaling, or TAU signaling.

5. The UE of claim 1 wherein the processor is configured to provide the indication responsive to all of 1) the UE being combined attached over an E-UTRAN, 2) the UE has provided voice and usage settings to a network, 3) the UE is IDLE camping in a GERAN or UTRAN, and 4) the UE becomes packet switched connected over the GERAN or UTRAN.

6. The UE of claim 1 wherein the processor is configured to provide the indication responsive to the UE having not determined if the UE has a voice solution in the E-UTRAN.

7. A method implemented in a user equipment (UE), the method comprising:
performing, by a processor, one of an attach procedure, Routing Area Update (RAU), or Tracking Area Update (TAU); and
thereafter causing the UE to provide an indication to a network, wherein the indication indicates whether the UE has determined a voice solution in an Evolved Universal Mobile Telecommunications System Terrestrial Radio Access Network (E-UTRAN).

8. The method of claim 7, wherein the indication is further configured to allow a SGSN to know whether the UE can be handed over to the E-UTRAN.

9. The method of claim 7, wherein the indication is implemented by inserting a value into a voice centric or data centric setting information element.

10. The method of claim 7, wherein the indication is implemented using a specific information element that indicates whether the UE can be handed over the E-UTRAN, and wherein the information element is used in at least one of GPRS signaling, EPC attach signaling, RAU signaling, or TAU signaling.

11. The method of claim 7, wherein the processor is configured to provide the indication responsive to all of 1) the UE being combined attached over an E-UTRAN, 2) the UE has provided voice and usage settings to a network, 3) the UE is IDLE camping in a GERAN or UTRAN, and 4) the UE becomes packet switched connected over the GERAN or UTRAN.

12. The method of claim 7, wherein the processor is configured to provide the indication responsive to the UE having not determined if the UE has a voice solution in the E-UTRAN.

13. A non-transitory computer readable medium storing a program which, when executed, performs the processor-implemented steps of:
a user equipment (UE) performing one of an attach procedure, Routing Area Update (RAU), or Tracking Area Update (TAU); and
thereafter causing the UE to provide an indication to a network, wherein the indication indicates whether the UE has determined a voice solution in an Evolved Universal Mobile Telecommunications System Terrestrial Radio Access Network (E-UTRAN).

14. The non-transitory computer readable medium of claim 13, wherein the indication is further configured to allow a SGSN to know whether the UE can be handed over to the E-UTRAN.

15. The non-transitory computer readable medium of claim 13, wherein the indication is implemented by inserting a value into a voice centric or data centric setting information element.

16. The non-transitory computer readable medium of claim 13, wherein the indication is implemented using a specific information element that indicates whether the UE can be handed over the E-UTRAN, and wherein the information element is used in at least one of GPRS signaling, EPC attach signaling, RAU signaling, or TAU signaling.

17. The non-transitory computer readable medium of claim 13, wherein the UE is configured to provide the indication responsive to all of 1) the UE being combined attached over an E-UTRAN, 2) the UE has provided voice and usage settings to a network, 3) the UE is IDLE camping in a GERAN or UTRAN, and 4) the UE becomes packet switched connected over the GERAN or UTRAN.

18. The non-transitory computer readable medium of claim 13, wherein the UE is configured to provide the indication responsive to the UE having not determined if the UE has a voice solution in the E-UTRAN.

* * * * *